(12) United States Patent
Suzuki et al.

(10) Patent No.: US 12,248,720 B2
(45) Date of Patent: Mar. 11, 2025

(54) IMAGE OUTPUT APPARATUS USING A MEASURED TEMPERATURE, IMAGE OUTPUT METHOD, AND STORAGE MEDIUM

(71) Applicant: CANON KABUSHIKI KAISHA, Tokyo (JP)

(72) Inventors: Nobukazu Suzuki, Kanagawa (JP); Atsushi Nakamura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/101,209

(22) Filed: Jan. 25, 2023

(65) Prior Publication Data

US 2023/0244429 A1    Aug. 3, 2023

(30) Foreign Application Priority Data

Jan. 31, 2022    (JP) ................................ 2022-013188
Oct. 18, 2022    (JP) ................................ 2022-166771

(51) Int. Cl.
     *G06F 15/00*      (2006.01)
     *G06F 3/12*      (2006.01)

(52) U.S. Cl.
     CPC .......... *G06F 3/1263* (2013.01); *G06F 3/1205* (2013.01); *G06F 3/1211* (2013.01)

(58) Field of Classification Search
None
See application file for complete search history.

(56) References Cited

U.S. PATENT DOCUMENTS

| | | | | |
|---|---|---|---|---|
| 2003/0095807 A1* | 5/2003 | Fujimori | ............ | G03G 15/2039 399/69 |
| 2004/0085552 A1* | 5/2004 | Ueda | .................. | H04N 1/00477 358/1.9 |
| 2011/0041091 A1* | 2/2011 | Sato | ....................... | G06F 3/1229 715/772 |
| 2012/0069367 A1* | 3/2012 | Iguchi | ................ | G03G 15/6544 358/1.13 |

(Continued)

FOREIGN PATENT DOCUMENTS

JP      2020-113115 A      7/2020

OTHER PUBLICATIONS

Machine translation of Japanese Patent Document No. 2020-113115, Jul. 27, 2020, Kameda (Year: 2020).*

*Primary Examiner* — Mark R Milia
(74) *Attorney, Agent, or Firm* — VENABLE LLP

(57) ABSTRACT

A system obtains a measured temperature of a fixing unit that fixes an applied agent applied on a print medium to the print medium by heat and identifies a print job whose temperature to be set associated with a type of print media to be used is closest to the measured temperature among a plurality of print jobs that are saved in a first saving unit and are yet to be identified. The temperature to be set is a temperature associated with each type of printing medium as the temperature to be set in the fixing unit when fixing. In addition, a printing control unit executes printing of the plurality of print jobs so that among the plurality of print jobs, an identified first print job or a print job for which a same type of print medium as the first print job is to be used is processed first.

17 Claims, 11 Drawing Sheets

(56) References Cited

U.S. PATENT DOCUMENTS

| | | | |
|---|---|---|---|
| 2015/0062623 A1* | 3/2015 | Yano | G06F 3/1222 |
| | | | 358/1.15 |
| 2016/0259278 A1* | 9/2016 | Izumiya | G03G 15/2039 |
| 2021/0055894 A1* | 2/2021 | Noguchi | G06F 3/1219 |
| 2022/0137886 A1* | 5/2022 | Nozawa | G06F 3/1221 |
| | | | 358/1.15 |

\* cited by examiner

IMAGE OUTPUT APPARATUS USING A MEASURED TEMPERATURE, IMAGE OUTPUT METHOD, AND STORAGE MEDIUM

BACKGROUND

Field

The present disclosure relates to an image output apparatus, an image output method, and a storage medium.

Description of the Related Art

The fixing temperature for fixing an ink to a print medium after printing varies by the print medium type and size. Japanese Patent Laid-Open No. 2020-113115 discloses a method in which print jobs are printed after being sorted in ascending order of fixing temperature based on fixing temperatures corresponding to print media to thereby improve the print efficiency.

The temperature of a fixing unit of an image output apparatus does not always remain constant. Thus, in the case of printing print jobs sorted in ascending order of fixing temperature as in Japanese Patent Laid-Open No. 2020-113115, it is necessary to wait until the temperature of the fixing unit becomes low and then perform the fixing if the temperature of the fixing unit is high. This may lower the print efficiency.

SUMMARY

In view of the above, the present disclosure provides an image output apparatus, image output method, and storage medium capable of suppressing a decrease in print efficiency.

An image output apparatus according to an aspect of the present disclosure is an image output apparatus including: a fixing unit that fixes an applied agent applied on a print medium to the print medium by heat; a first saving unit that saves therein one or more print jobs each including a print medium type; a second saving unit that saves therein temperature information corresponding to the print medium type; a spooling unit capable of spooling a plurality of print jobs; a printing unit that executes printing by sequentially processing print jobs spooled by the spooling unit; a temperature obtaining unit that obtains a temperature of the fixing unit; and a print job identification unit that identifies a print job corresponding to the temperature information representing a closest temperature to the temperature obtained by the temperature obtaining unit among print jobs that are saved in the first saving unit and are yet to be identified, in which the spooling unit spools a plurality of the print jobs identified by the print job identification unit in an order in which the print jobs were identified.

According to the present disclosure, it is possible to provide an image output apparatus, image output method, and storage medium capable of suppressing a decrease in print efficiency.

Further features of the present invention will become apparent from the following description of exemplary embodiments with reference to the attached drawings.

DESCRIPTION OF THE EMBODIMENTS

First Embodiment

A first embodiment of the present disclosure will be described below with reference to drawings.

Figure 1:
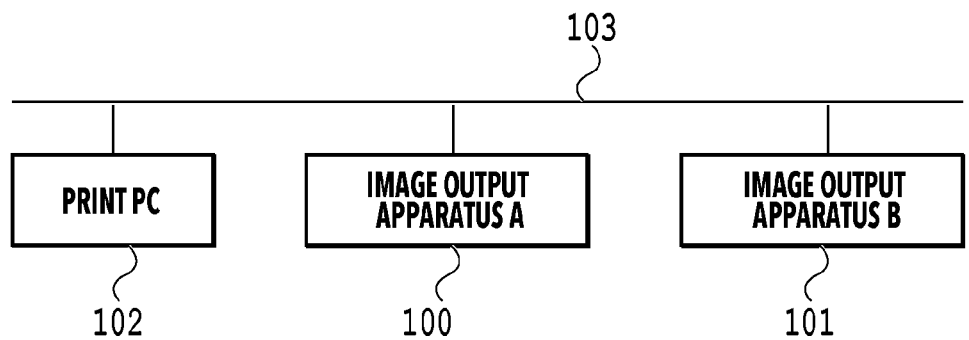
FIG. 1 is a diagram illustrating an example of a system configuration in a network environment.

FIG. 1 is a diagram illustrating an example of a system configuration in a network environment for performing printing with an image output apparatus 100 in the present embodiment. A print PC 102 is capable of connecting to image output apparatuses (100 and 101) via a network 103. The print PC 102 creates print jobs and sends them to the image output apparatuses (100 and 101). In the present embodiment, an example in which two image output apparatuses are connected is illustrated. However, the number of image output apparatuses are not limited to this number, and may be one or three or more. Also, there is only one print PC, but there may be two or more. The image output apparatuses (100 and 101) store status information updated as a result of changing sheets to be fed, configuring device settings, and so on. The image output apparatuses 100 and 101 are similar in configuration. Thus, the following description will be given using the image output apparatus 100 as an example.

Figure 2:
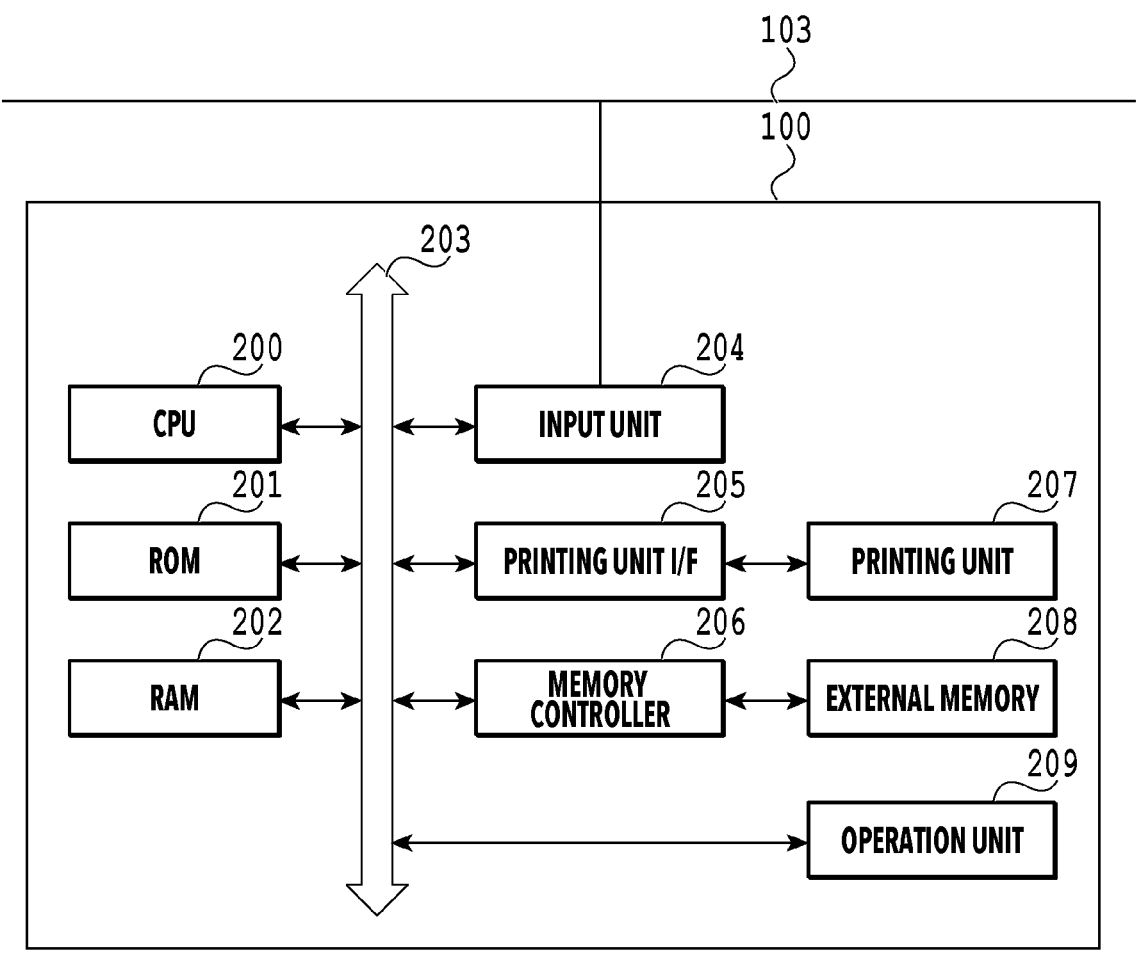
FIG. 2 is a diagram illustrating an example of the hardware configuration of an image output apparatus.

FIG. 2 is a diagram illustrating an example of the hardware configuration of the image output apparatus 100. The image output apparatus 100 is controlled by a central processing unit (CPU) 200. The CPU 200 operates based on a control program or the like stored in a program read only memory (ROM) in a ROM 201 or a control program or the like stored in an external memory 208. The CPU 200 outputs an image signal as output information to a printing unit (printer engine) 207 connected to a printing unit interface (I/F) 205 via a system bus 203. The CPU 200 is capable of performing communication processing with the print PC 102 via an input unit 204, and notifying the print PC 102 of information inside the image output apparatus 100. The CPU 200 is also capable of receiving output data to be output to the printing unit 207 via the input unit 204.

A random access memory (RAM) 202 functions as a main memory, a work area, etc. for the CPU 200, and is configured to be capable of expanding the memory capacity with an optional RAM connectable to an expansion port not illustrated. The RAM 202 is used as an output information loading region, an environment data storage region, a non-volatile memory, and the like. Access to the external memory 208, which is a hard disk drive (HDD), an integrated circuit (IC) card, or the like, is controlled by a memory controller 206. The external memory 208 is connectable as an optional memory and stores font data, an emulation program, form data, information on paper types registered in the image output apparatus, paper attribute information, and so on. An operation unit 209 includes a panel and displays various pieces of information.

Figure 3:
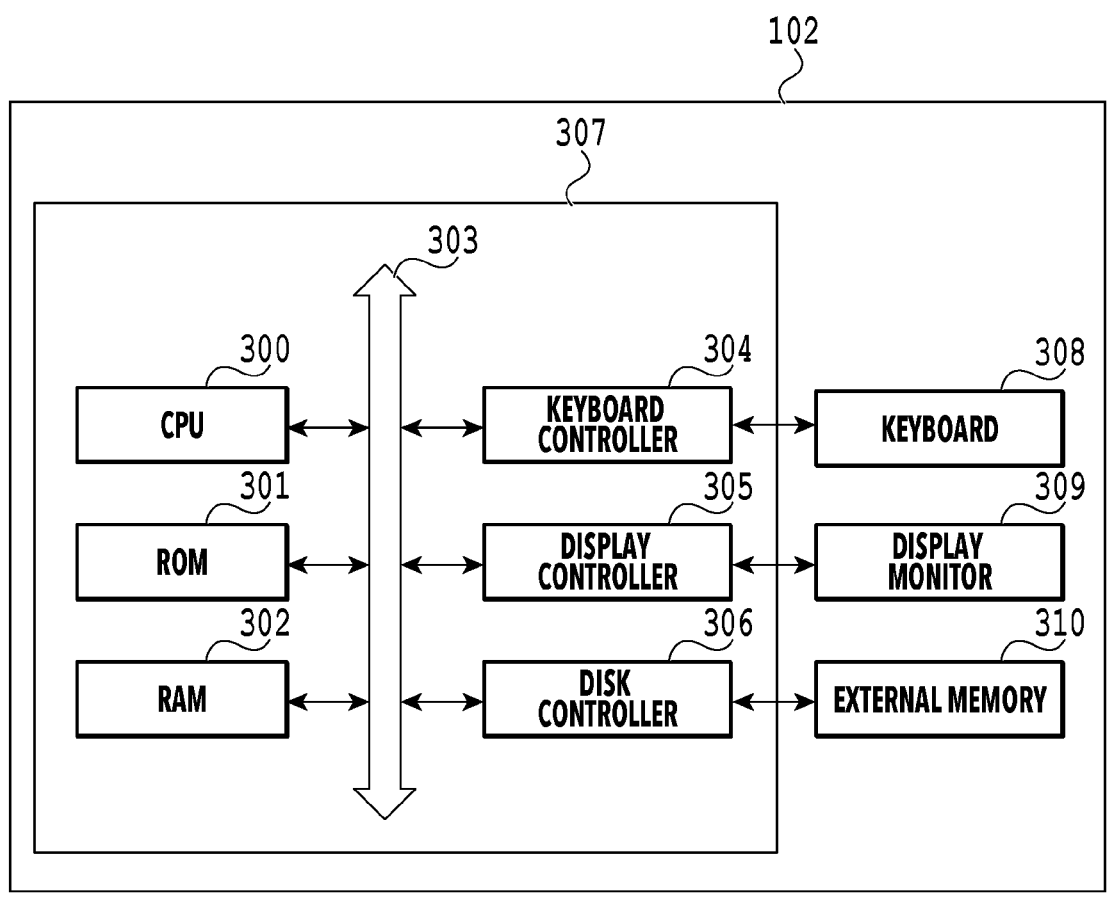
FIG. 3 is an example block diagram illustrating a computer configuration of a print personal computer (PC)

FIG. 3 is an example block diagram illustrating a computer configuration of the print PC 102. An inside 307 of the computer has a CPU 300, a ROM 301, a RAM 302, a keyboard controller 304, a display controller 305, and a disk controller 306. The CPU 300 reads various programs such as a control program, a system program, and an application program out of an external memory 310 via the disk controller 306 into the RAM 302. The CPU 300 executes the various programs read in the RAM 302 to perform various types of data processing and control the display of a display monitor 309. The CPU 300 may be configured to read the control program and so on out of the ROM 301. The CPU 300 may be a dedicated circuit such as an application-specific integrated circuit (ASIC). The CPU 300 and the dedicated circuit represent examples of a hardware circuit and hardware processor.

The disk controller 306 controls access to the external memory 310, such as an HDD, a compact disc read-only memory (CD-ROM), a digital versatile disc read-only memory (DVD-ROM), or a universal serial bus (USB) flash drive. The RAM 302 is configured such that its capacity can be expanded with an optional RAM or the like not illustrated, and is used mainly as a work area for the CPU 300. The keyboard controller 304 controls key inputs from a keyboard 308 and a pointing device not illustrated. The display controller 305 controls the display of the display monitor 309. In the present embodiment, the CPU 300 controls each component connected to a main bus 303 via the main bus 303, unless otherwise noted.

Figure 4:
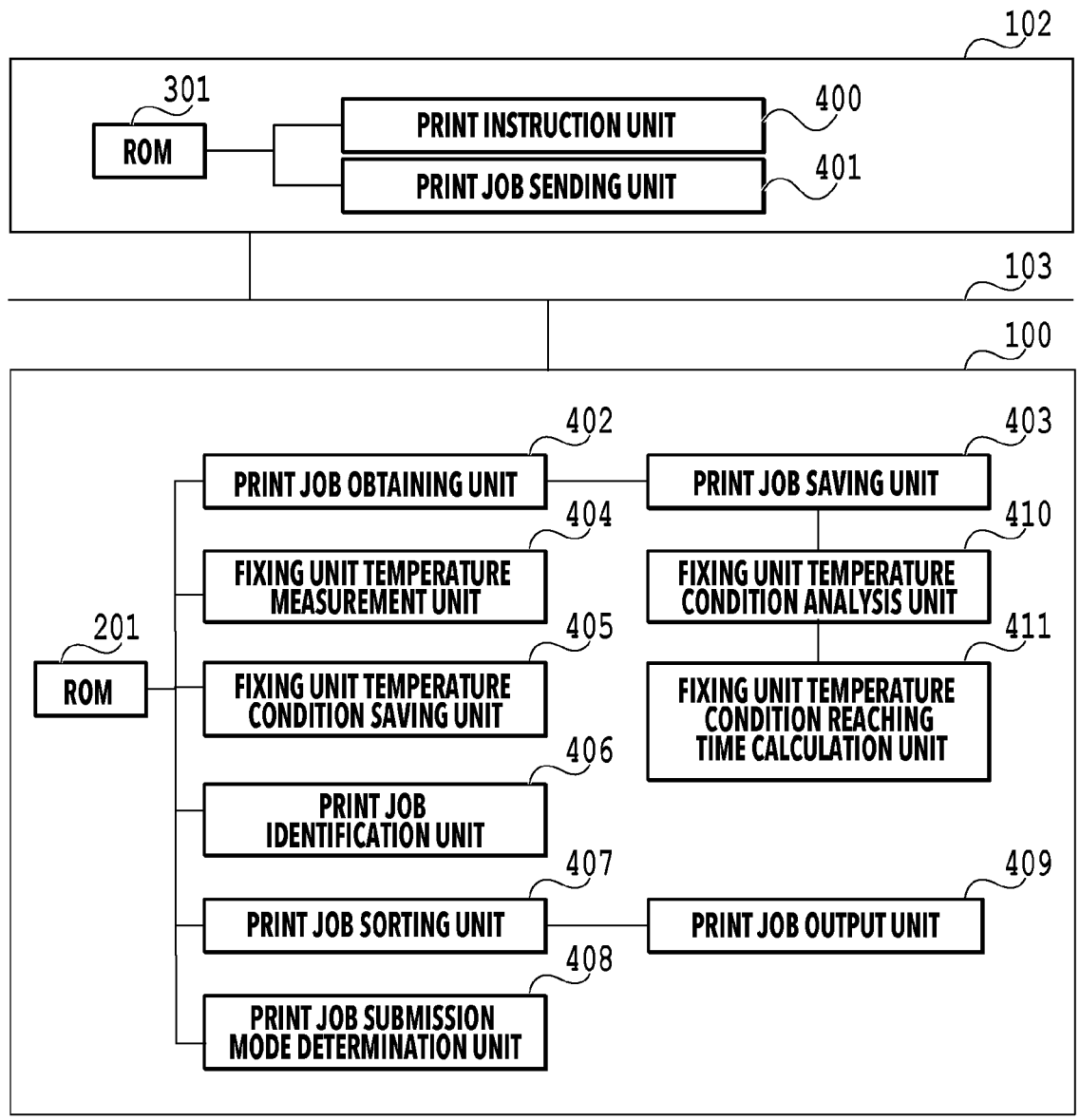
FIG. 4 is a diagram illustrating an example of functional blocks in a system.

FIG. 4 is a diagram illustrating an example of functional blocks in a system including the image output apparatus 100 and the print PC 102. Note that a fixing unit to be described in the present embodiment is configured to fix (dry) a liquid applied on a print medium (ink, applied agent) by heat, and may be referred to as "drying unit" or another name. First of all, functional blocks in the image output apparatus 100 will be described. In the ROM 201, there are a print job obtaining unit 402, a fixing unit temperature measurement unit 404, a fixing unit temperature condition saving unit 405, a print job identification unit 406, and a print job sorting unit 407.

In the fixing unit temperature condition saving unit 405, a fixing unit temperature condition to be set when the image output apparatus 100 performs printing is saved for each medium (print medium) type supported by the printer. In a case where a print instruction unit 400 of the print PC 102 issues a print instruction, a print job is obtained from a print job sending unit 401 by the print job obtaining unit 402 of the image output apparatus 100 via the network 103. The print job obtained by the print job obtaining unit 402 is then temporarily saved to a print job saving unit 403. The print job contains information on the print medium type to be used.

Upon start of processing in the present embodiment, the print job identification unit 406 identifies the fixing unit temperature set for the printing of each print job saved in the print job saving unit 403 based on the print medium type designated in the print job. Then, the print jobs are sorted by the print job sorting unit 407 in an order based on the temperature of the fixing unit measured by the fixing unit temperature measurement unit 404, and sent to a print job output unit 409 in that order. A print job submission mode determination unit 408, whose settings can be configured by the user in advance, determines the current print job submission mode (whether to accept a new print job during printing or not to accept a new print job during printing).

A fixing unit temperature condition analysis unit 410 analyzes the temperature distribution of the fixing unit temperature conditions for all print jobs in the print job saving unit 403 based on the fixing unit temperature conditions in the fixing unit temperature condition saving unit 405. A fixing unit temperature condition reaching time calculation unit 411 calculates the total time taken to reach the fixing unit temperature condition set for each print job to be printed by the image output apparatus 100.

Next, functional blocks in the print PC 102 will be described. Firstly, the print instruction unit 400 issues a print instruction, and the print job sending unit 401 sends a print job to the image output apparatus 100 via a printer driver and spooler installed in the print PC 102 in advance.

Figure 5:
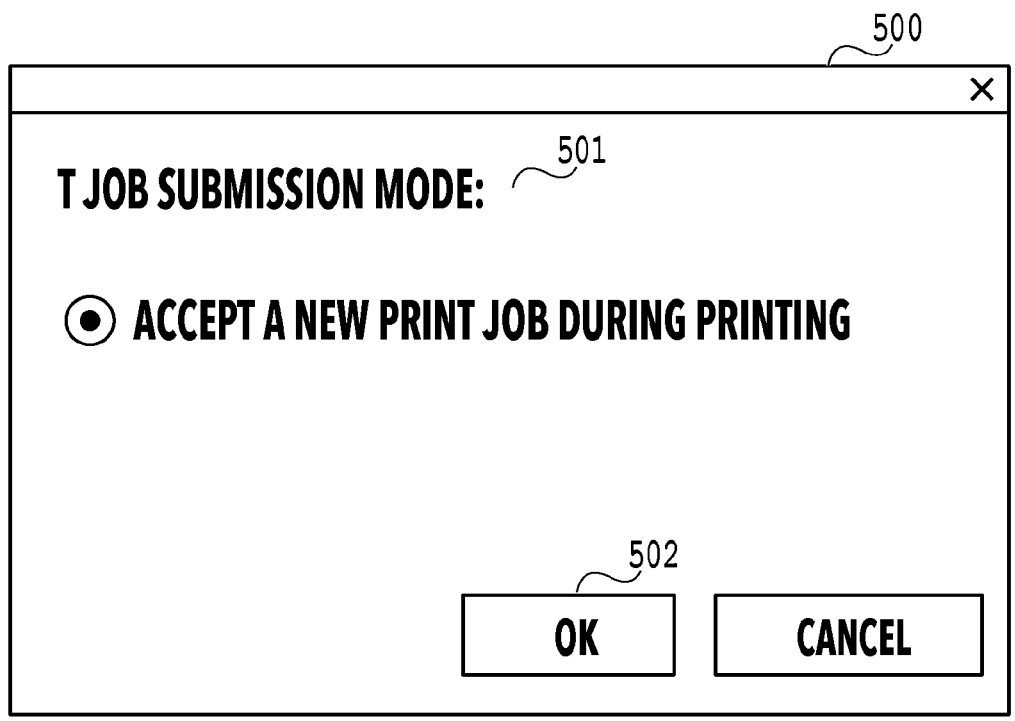
FIG. 5 is a diagram illustrating an example of a display screen of print setting information.

FIG. 5 is a diagram illustrating an example of a display screen 500 of print setting information displayed on the operation unit 209 of the image output apparatus 100. The display screen 500 allows the user to select whether to accept a new print job during printing or not to accept a new print job during printing on a print job submission mode setting section 501. Turning on the radio button brings the print job submission mode to one that accepts a new print job during printing. Turning off the radio button brings the print job submission mode to one that does not accept a new print job during printing. On the display screen, there may be a display screen with a content other than the above. Pressing an OK button 502 sets the print job submission mode of the image output apparatus 100.

Figure 6:
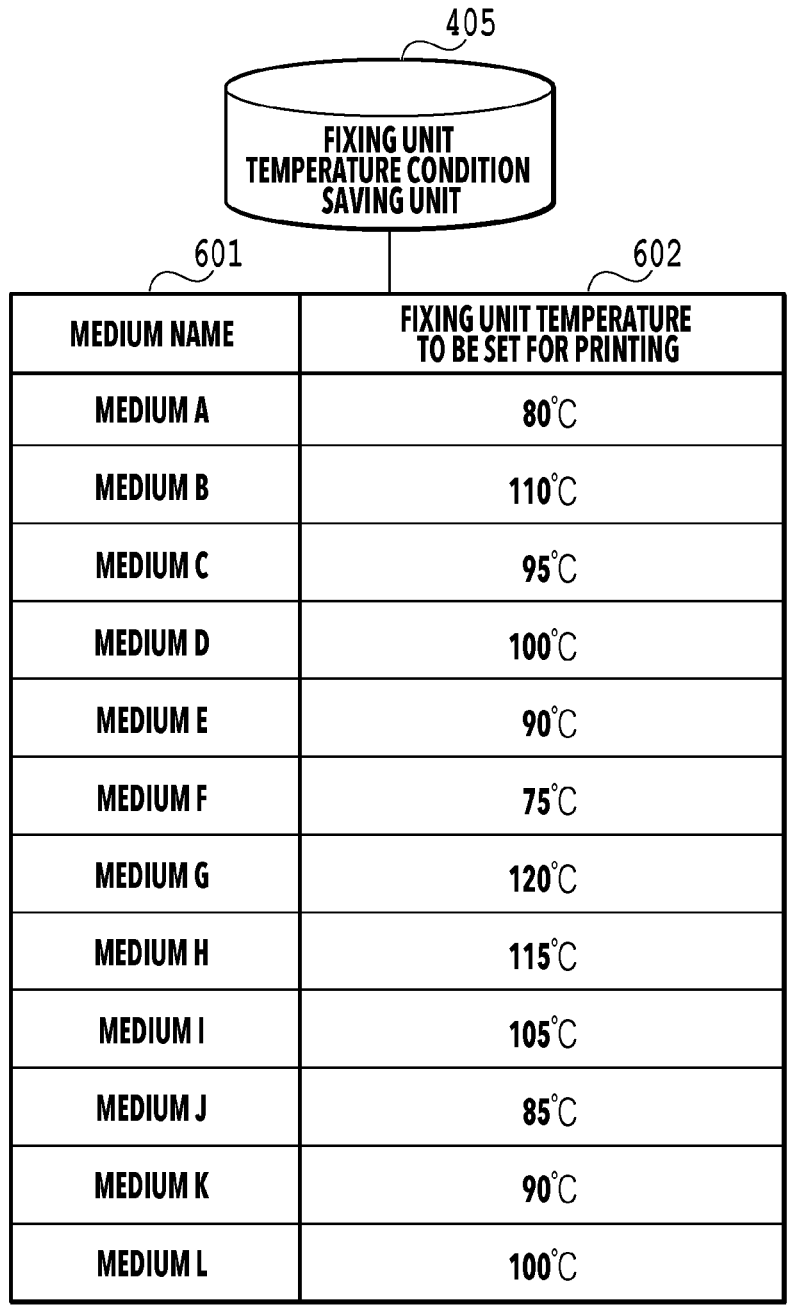
FIG. 6 is a diagram illustrating fixing unit temperatures for printing media.

FIG. 6 is a diagram illustrating fixing unit temperatures (temperature information) for printing of print media stored in the fixing unit temperature condition saving unit 405 of the image output apparatus 100. In the fixing unit temperature condition saving unit 405, display sections 601 for names of media which the image output apparatus 100 can print, and fixing unit temperatures 602 which are set in a case of printing these media are included in a one-to-one correspondence. More medium names may be saved or less medium names may be saved, as a matter of course. The medium names may be saved in any order. Moreover, parameters other than the above may be included in the fixing unit temperature condition saving unit.

Figure 7:
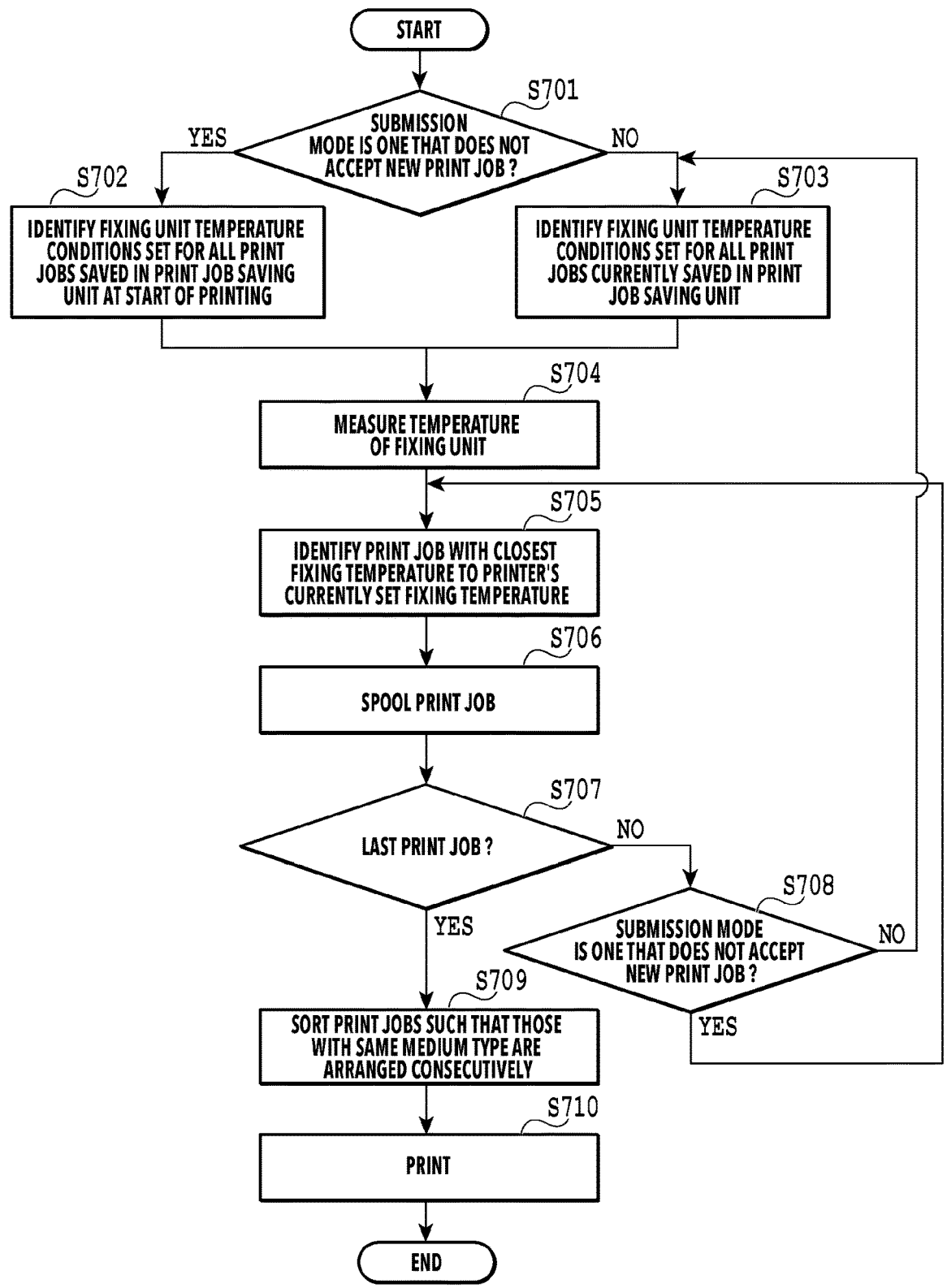
FIG. 7 is a flowchart illustrating print processing.

FIG. 7 is a flowchart illustrating print processing in the present embodiment. Note that the CPU 200 of the image output apparatus 100 performs the series of processes illustrated in FIG. 7 by loading program code stored in the ROM 201 to the RAM 202 and executing it. Alternatively, the functions of some or all of the steps in FIG. 7 may be implemented with hardware such as an ASIC or an electronic circuit. Meanwhile, the symbol "S" in the description of each process means a step in the flowchart.

Upon start of the print processing, the CPU 200 determines in S701 whether the operation mode is the one that accepts a new print job. The CPU 200 proceeds to S702 if the mode is the one that does not accept a new print job after the start of the print processing, and proceeds to S703 if the mode is the one that accepts a new print job after the start of the print processing. If proceeding to S702, the CPU 200 identifies the fixing unit temperature conditions set for print jobs saved in the print job saving unit 403 at the start of the print processing. If proceeding to S703, the CPU 200 identifies the set fixing unit temperature conditions based on the print medium types in the print jobs currently saved in the print job saving unit 403.

Then, in S704, the CPU 200 measures the temperature of the fixing unit of the image output apparatus 100 with the temperature measurement unit (temperature obtaining unit) 404. Then, in S705, based on the temperature of the fixing unit measured with the temperature measurement unit 404 and the print medium types in the print jobs saved in the print job saving unit 403, the CPU 200 identifies the print job for which the closest temperature to the temperature of the fixing unit is set. The image output apparatus 100 can spool (capable of spooling) a plurality of print jobs and in S706 spools the print job identified in S705.

Then, in S707, the CPU 200 determines whether the print job identified in S705 is the last print job saved in the print job saving unit 403. The CPU 200 proceeds to S708 if the print job is not the last one, and proceeds to S709 if the print job is the last one. If proceeding to S708, the CPU 200 determines whether the submission mode is the one that accepts a new print job, as in S701. The CPU 200 proceeds to S705 and repeats the processing if the mode is the one that does not accept a new print job, and proceeds to S703 and repeats the processing if the mode is the one that accepts a new print job. In the case of accepting a new print job after the start of the print processing, it is unknown when a new job will come in, and that new print job may be one with a fixing unit temperature close to or the same as the current temperature. Thus, in S703, even in a case where a new print job comes in, the CPU 200 identifies the fixing unit temperature condition set for each print job saved in the print job saving unit 403 at that point based on the print medium type in the print job.

If proceeding to S709 from S707, the CPU 200 sorts the spooled print jobs such that print jobs with the same print medium type will be processed consecutively. Some print media are different in type but the same in fixing unit temperature condition. Thus, the print jobs are sorted such that those using print media with the same fixing unit temperature condition are arranged consecutively, so as to perform the print processing efficiently. Then, in S710, the CPU 200 performs printing by sequentially processing the sorted print jobs, and terminates the processing.

Note that the present embodiment has been described using an image output apparatus that performs printing by applying a liquid (ink) onto a print medium as an example. However, the present embodiment is not limited to this case, and may be applied to electrophotographic-type printers, which use toners.

As described above, print jobs are printed in such an order that the closer the temperature condition is to the temperature of the fixing unit, the earlier the print job is printed. This makes it possible to provide an image output apparatus, image output method, and storage medium that do not need to wait until the temperature of the fixing unit becomes a low temperature and can thus suppress a decrease in print efficiency.

Second Embodiment

A second embodiment of the present disclosure will be described below with reference to a drawing. Note that the basic configuration in the present embodiment is similar to that in the first embodiment, and the characteristic configuration will therefore be described below.

Figure 8:
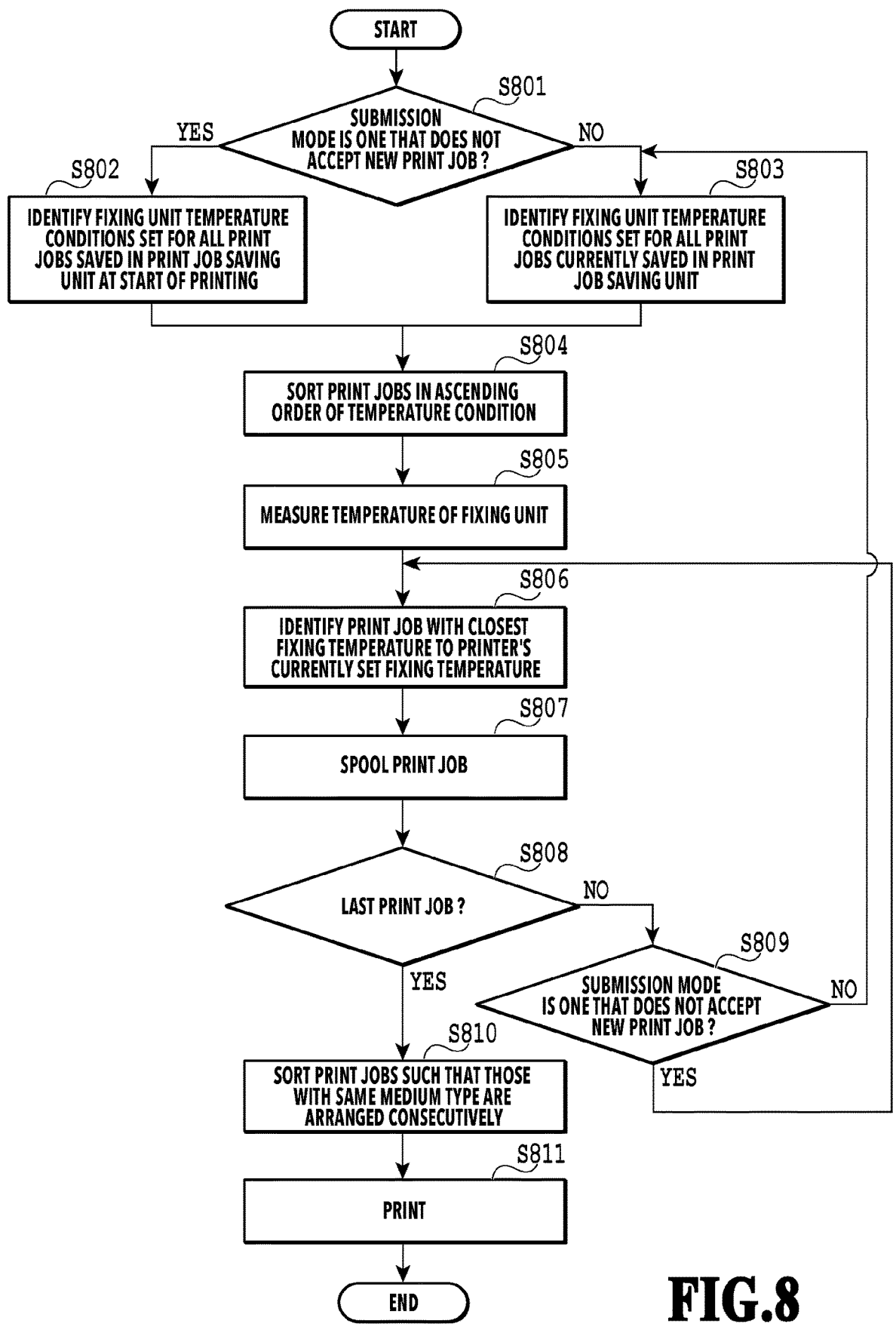
FIG. 8 is a flowchart illustrating print processing.

FIG. 8 is a flowchart illustrating print processing in the present embodiment. Note that the CPU 200 of the image output apparatus 100 performs the series of processes illustrated in FIG. 8 by loading program code stored in the ROM 201 to the RAM 202 and executing it. Alternatively, the functions of some or all of the steps in FIG. 8 may be implemented with hardware such as an ASIC or an electronic circuit. Meanwhile, the symbol "S" in the description of each process means a step in the flowchart.

The print processing in the present embodiment involves a process of S804 added before S704 in the print processing in the first embodiment described above. The other processes are similar to those in the first embodiment. Thus, description of the processes other than S804 is omitted.

In S804, the CPU 200 sorts the print jobs saved in the print job saving unit 403 in ascending order of temperature condition. Sorting the print jobs in this manner improves the efficiency of identification of a print job in a subsequent process, and accordingly improves the processing speed. Note that the print jobs are sorted in ascending order of temperature condition in the present embodiment. However, the present embodiment is not limited to this case. Specifically, the print jobs may be sorted such that their temperature conditions are arranged based on a predetermined rule, not randomly. For example, the print jobs may be sorted in descending order.

Third Embodiment

A third embodiment of the present disclosure will be described below with reference to drawings. Note that the basic configuration in the present embodiment is similar to that in the first embodiment, and the characteristic configuration will therefore be described below. In the first embodiment, printing is performed by sequentially processing sorted print jobs. The present embodiment is aimed at improving user-friendliness by further executing a notification process.

Figure 9:
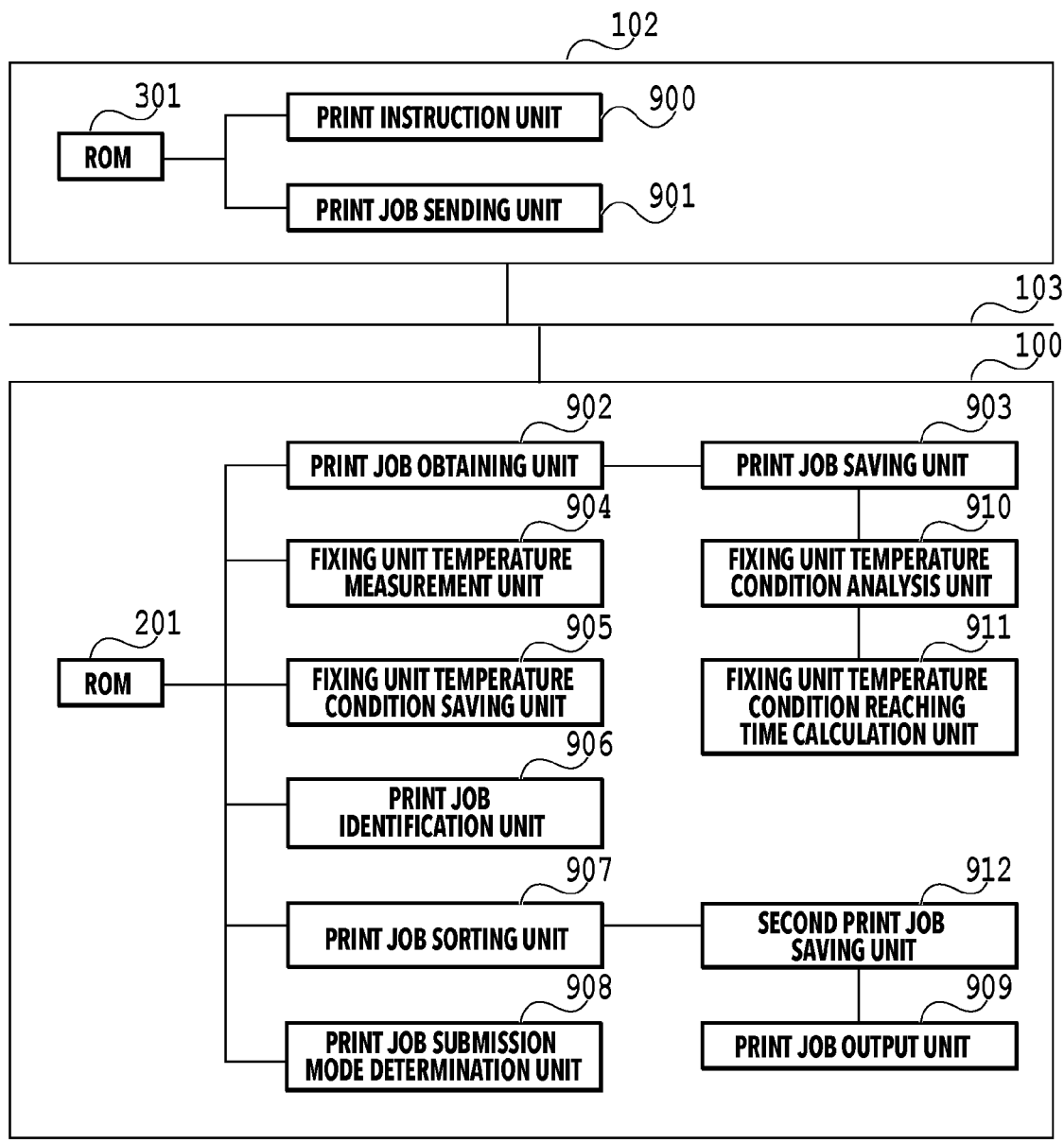
FIG. 9 is a diagram illustrating an example of functional blocks in a system.

A system configuration in the present embodiment will be described using FIG. 9. Note that reference signs 100 to 911 in FIG. 9 represent the same components as those with reference signs 100 to 411 in FIG. 4, and detailed description thereof is therefore omitted. The image output apparatus 100 includes a second print job saving unit 912 that saves therein print jobs in the order in which the print jobs are sorted by the print job sorting unit 907.

Figure 11:
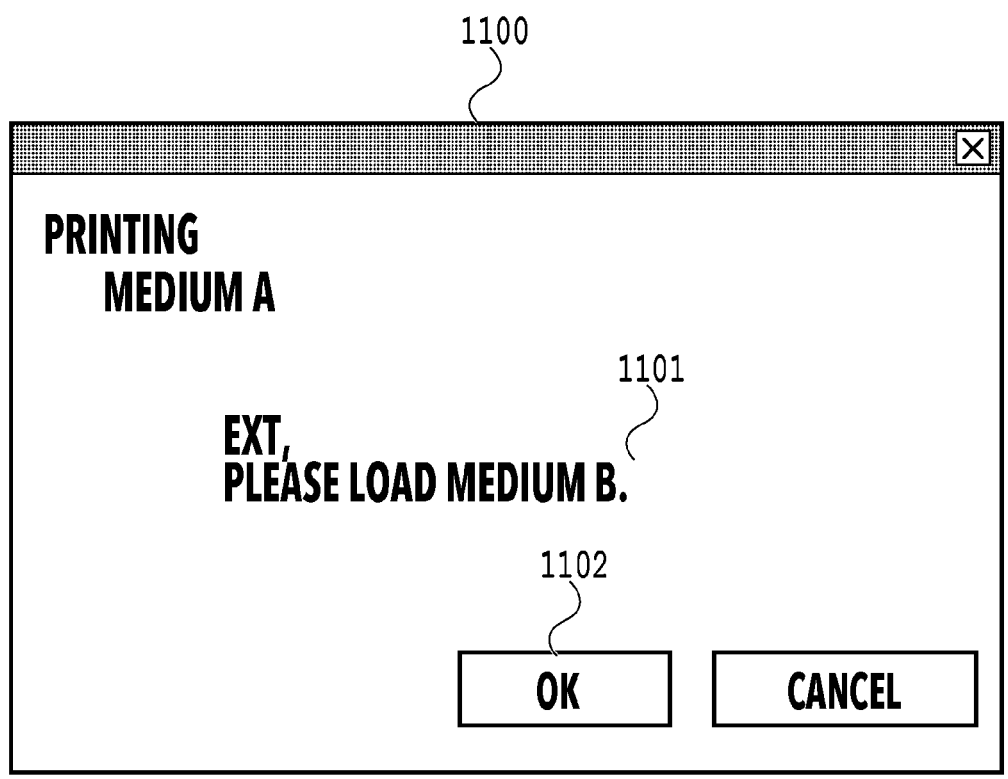
FIG. 11 is a diagram illustrating an example of a display screen of print setting information.

FIG. 11 is a diagram illustrating an example of a display screen 1100 of a candidate print medium to be printed displayed on the operation unit 209 of the image output apparatus 100. The display screen 1100 displays the current status of the printer ("Printing" in the illustrated example) and the print medium loaded in the printer (medium A in the present embodiment). A message 1101 indicates a candidate print medium to be loaded next (medium B in the present embodiment), which is determined by the CPU 200. In a case where an OK button 1102 is pressed, the image output apparatus 100 returns to a normal screen.

Figure 10:
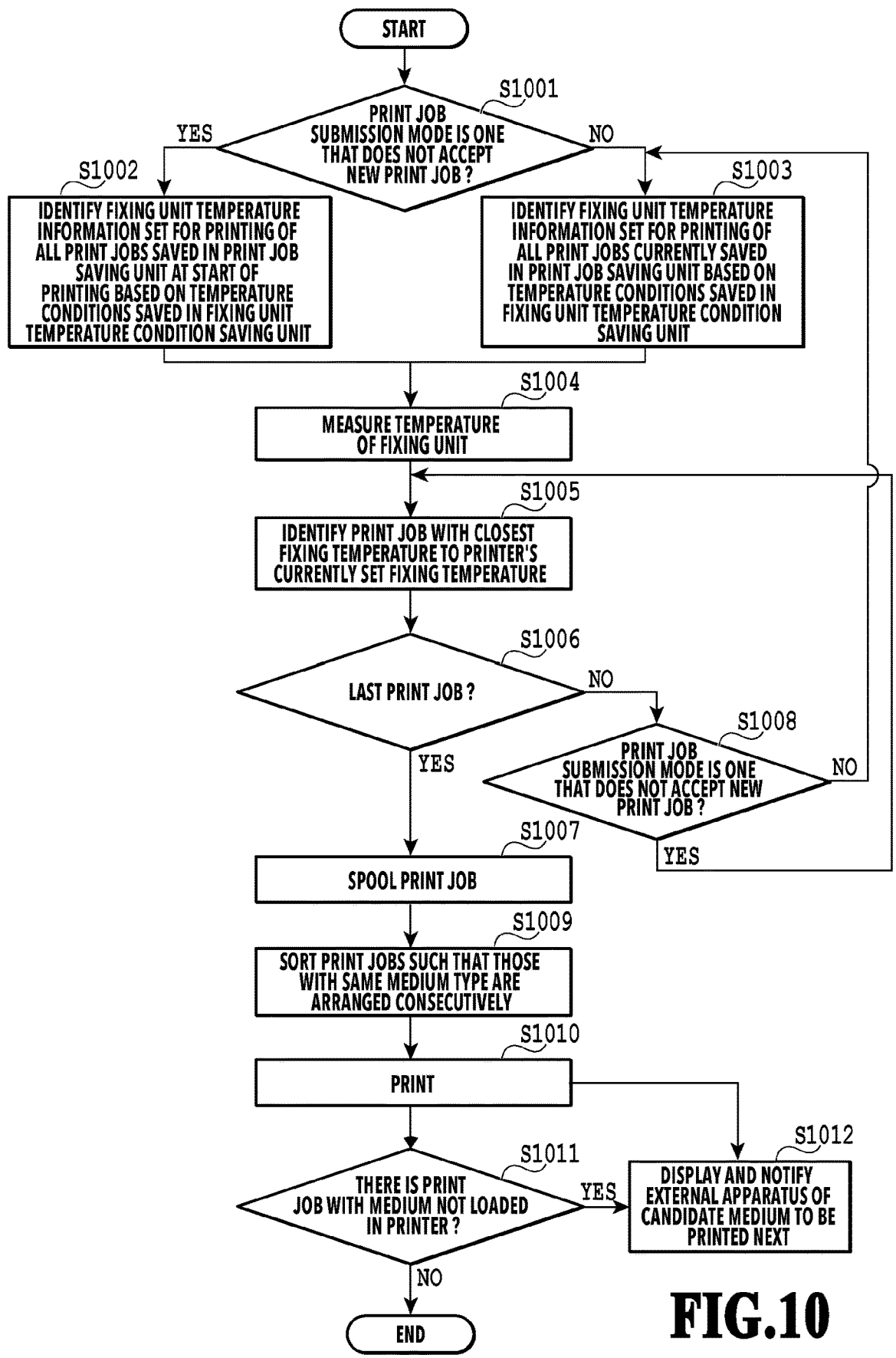
FIG. 10 is a flowchart illustrating print processing.

Next, processing in the present embodiment will be described using the flowchart of FIG. 10. Note that S1001 to S1010 in FIG. 10 are the same as S701 to S710 in FIG. 7, and detailed description thereof is therefore omitted. The processes of S1011 and the subsequent step in FIG. 10 will be described in detail.

In S1011, during the printing, the CPU 200 determines whether there is a print job with a print medium not currently loaded in the printer among the print jobs yet to be printed in the second print job saving unit 912. If determining that there is such a print job, the CPU 200 proceeds to S1012. The CPU 200 then displays that print medium as a candidate print medium to be printed next on the operation unit 209.

The CPU 200 also notifies the print PC 102 of the candidate print medium to be printed next. The CPU 200 may simultaneously display the candidate print medium to be printed next on the operation unit 209 and notify the print PC 102 of the next candidate print medium. Moreover, the print PC 102 may display the next candidate print medium notified of on another print PC 102.

Items to be displayed may include not only the next candidate print medium but also the remaining print time for the currently printed print medium (the time before the print medium needs to be changed to the next one), and an approximate time for changing the print medium, and the like.

According to the present embodiment, a candidate medium to be loaded next is displayed during printing. This allows the user to prepare the print medium to be loaded next during the printing and can therefore shorten the time taken to prepare the print medium.

Also, by displaying the remaining print time for the print job with the print medium currently loaded in the printer and the time taken to change the print medium, the user can perform an efficient operation.

OTHER EMBODIMENTS

The present disclosure can be implemented by providing a program that implements one or more of the functions of the above embodiment to a system or an apparatus via a network or a storage medium, and causing one or more processors in a computer of the system or the apparatus to read out and execute the program. Alternatively, the present invention can be implemented with a circuit (e.g., ASIC) that implements one or more of the functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-013188 filed Jan. 31, 2022, and Japanese Patent Application No. 2022-166771 filed Oct. 18, 2022, which are hereby incorporated by reference herein in its their entirety.

What is claimed is:

1. A system that includes an image output apparatus, the system comprising:
   at least one memory and at least one processor and/or at least one circuit which function as:
   a sorting unit configured to sort a plurality of print jobs that are saved in a first saving unit in order based on a temperature to be set associated with a type of print medium to be used in each job, wherein the temperature to be set is a temperature associated with each type of print medium as the temperature to be set in a fixing unit when fixing;
   a measured temperature obtaining unit configured to obtain a measured temperature of the fixing unit that fixes an agent applied to the print medium by heat;
   a print job identification unit configured to identify, based on the measured temperature obtained by the measured temperature obtaining unit, a print job whose temperature to be set associated with a type of print medium to be used is closest to the measured temperature among the plurality of print jobs sorted by the sorting unit;
   a spooling unit configured to spool a plurality of the print jobs identified by the print job identification unit in an order in which the print jobs were identified;
   a printing control unit configured to perform control to execute printing the plurality of print jobs by sequentially processing print jobs spooled by the spooling unit so that among the plurality of print jobs, a first print job identified first by the print job identification unit or a print job for which a same type of print medium as the first print job is to be used is processed first;
   a determination unit configured to determine whether a next print job is a print job using an other medium type that has not been loaded into the image output apparatus among the plurality of print jobs spooled by the spooling unit; and
   a display control unit configured to perform control to display, in a case where the determination unit determines there is a print job using the other medium type, first information representing the other medium type, second information representing a remaining print time for one or more print jobs with a first type of print medium currently loaded in the image output apparatus, and third information representing an approximate time for loading the other medium type image into the image output apparatus.

2. The system according to claim 1, wherein the sorting unit sorts print jobs spooled by the spooling unit by print medium type.

3. The system according to claim 2, wherein the sorting unit sorts the print jobs such that print jobs with a same print medium type are arranged consecutively.

4. The system according to claim 1, wherein the sorting unit sorts the print jobs saved in the first saving unit based on a predetermined rule.

5. The system according to claim 4, wherein the sorting unit sorts the print jobs in ascending order based on the temperature information.

6. The system according to claim 4, wherein the at least one memory and the at least one processor and/or at the least one circuit further function as a printing unit that executes printing by sequentially processing print jobs spooled by the spooling unit;

wherein the printing unit executes printing by sequentially processing the print jobs sorted by the sorting unit.

7. The system according to claim 1, wherein operation modes used in the image output apparatus include a first mode that does not accept a new print job after start of print processing, and a second mode that accepts a new print job after start of print processing.

8. The system according to claim 1, wherein the display control unit performs control to display the first information and the second information on a display of an apparatus that transmits the plurality of print jobs to the image output apparatus.

9. The image output method according to claim 1, wherein a first temperature associated with the first type of medium is different from a second temperature associated with the second type of medium.

10. The image output method according to claim 1, wherein the display control unit performs control to display the first information, the second information, the third information, and fourth information representing the first type of medium on a same screen.

11. An image output method comprising:

sorting a plurality of print jobs that are saved in a first saving unit in order based on a temperature to be set associated with a type of print medium to be used in each job, wherein the temperature to be set is a temperature associated with each type of print medium as the temperature to be set in a fixing unit when fixing;

obtaining a measured temperature of the fixing unit that fixes an agent applied to the print medium by heat;

identifying, based on the obtained measured temperature, a print job whose temperature to be set associated with a type of print medium to be used is closest to the measured temperature among the plurality of sorted print jobs;

spooling a plurality of the identified print jobs identified in an order in which the print jobs were identified;

executing printing of the plurality of print jobs by sequentially processing the spooled print jobs spooled so that among the plurality of print jobs, a first print job identified first or a print job for which a same type of print medium as the first print job is to be used is processed first;

determining whether a next print job is a print job using an other medium type that has not been loaded into the image output apparatus among the plurality of spooled print jobs; and displaying, in a case where it is determined there is a print job using the other medium type, first information representing the other medium type, second information representing a remaining print time for one or more print jobs with a first type of print medium currently loaded in the image output apparatus, and third information representing an approximate time for loading the other medium type image into the image output apparatus.

12. The image output method according to claim 11, wherein the plurality of print jobs are spooled and are sorted by print medium type.

13. The image output method according to claim 11, wherein the saved print jobs are sorted based on a predetermined rule.

14. The image output method according to claim 13, wherein the saved print jobs are sorted in ascending order based on the temperature information.

15. The image output method according to claim 11, wherein operation modes used for the image output method include a first mode that does not accept a new print job after start of print processing, and a second mode that accepts a new print job after start of print processing.

16. The image output method according to claim 12, further comprising notifying of a message about preparation of a sheet to be used for the print jobs spooled in the spooling in a case where the sheet is not loaded.

17. A non-transitory computer readable storage medium storing a predetermined program, wherein the predetermined program causes a computer to execute a process comprising:

sorting a plurality of print jobs that are saved in a first saving unit in order based on a temperature to be set associated with a type of print medium to be used in each job, wherein the temperature to be set is a temperature associated with each type of print medium as the temperature to be set in a fixing unit when fixing;

obtaining a measured temperature of the fixing unit that fixes an agent applied to the print medium by heat;

identifying, based on the obtained measured temperature, a print job whose temperature to be set associated with a type of print medium to be used is closest to the measured temperature among the plurality of sorted print jobs;

spooling a plurality of the identified print jobs in an order in which the print jobs were identified;

executing printing of the plurality of print jobs by sequentially processing the spooled print jobs spooled so that among the plurality of print jobs, a first print job identified first by the print job identification unit or a print job for which a same type of print medium as the first print job is to be used is processed first;

determining whether a next print job is a print job using an other medium type that has not been loaded into the image output apparatus among the plurality of spooled print jobs; and displaying, in a case where it is determined there is a print job using the other medium type, first information representing the other medium type, second information representing a remaining print time for one or more print jobs with a first type of print medium currently loaded in the image output apparatus, and third information representing an approximate time for loading the other medium type image into the image output apparatus.

* * * * *